United States Patent Office 3,083,172
Patented Mar. 26, 1963

3,083,172
GRAFT COPOLYMER OF AN ACRYLIC ESTER WITH POLY(VINYL ACETATE)
Joseph David Scott, Walter W. Toy, and Dorothy E. Madge, Philadelphia, Pa., assignors to Rohm & Haas Company, Philadelphia, Pa., a corporation of Delaware
No Drawing. Filed Feb. 26, 1959, Ser. No. 795,583
10 Claims. (Cl. 260—29.6)

This invention relates to modified copolymers of at least one ester of methacrylic acid or acrylic acid and it is particularly concerned with a copolymer of at least one ester of acrylic acid or methacrylic acid with a poly(vinyl acetate).

Polymers of vinyl acetate and of acrylic esters have found considerable usage as coating materials, and among the compositions employed for this purpose are the aqueous dispersions obtained by emulsion polymerization thereof.

The acrylic ester polymers are characterized by excellent resistance to light and weathering, being substantially more durable than polymers of vinyl acetate. Various thickening agents have been used to render such aqueous dispersions of the synthetic polymers especially when pigmented, of suitable viscosity for use as coating compositions to be applied by spraying or by brushing. The terms "flow" and "leveling" are qualitative designations which refer to the character of the aqueous system in respect to its ability to be applied as by brushing and to flow in such a manner over the substrate as to avoid excessive showing of brush marks or to assure a complete absence thereof after drying. In thickened aqueous polymer systems, good flow and leveling properties are sometimes present with such common thickening agents as methyl cellulose. However, in some of the aqueous systems formed with linear polymeric resin binders, the most common thickening agents do not provide good flow and leveling. While these latter polymer systems may sometimes provide adequate flow and leveling characteristics for application to textured or rough surfaces, where the texture or roughness hides or masks other irregularities of the coatings, nevertheless on smooth surfaces these latter resin formulations using the known common thickeners sometimes show brush marks to an excessive extent. It is an object of the present invention to provide aqueous emulsion copolymer dispersions which have the essential durability characteristics of acrylic ester polymers and have superior flow and leveling characteristics with various common thickening agents.

In accordance with the present invention, it has been found that aqueous coating compositions having superior flow and leveling characteristics can be obtained in conjunction with the excellent resistance qualities of the esters of acrylic acid or methacrylic acid by the use therein of a copolymer obtained by granting at least one of such esters on a preformed polymer of vinyl acetate in the presence of an incompletely saponified polyvinyl acetate. The proportion of vinyl acetate within the resultant graft copolymer may be from $1/19$ to $1/3$ of the acrylic ester component, by which latter term is meant the entire weight of monomeric ester or esters of acrylic acid and methacrylic acid.

By preparing a graft copolymer of this composition in the special manner set out hereinafter, it has been found possible to produce aqueous coating compositions suitably thickened for application by brushing, spraying, or the like which have a yield value or yield stress determined as described hereinafter of not over three and even as low as zero in many cases. Coating compositions having such low yield values are characterized by excellent flow and leveling and are capable of brushing without showing excessive brush marks.

Copolymers obtained by the simple direct copolymerization of monomeric vinyl acetate with the acrylic ester or esters does not provide coating compositions having the low yield values obtained by the grafting procedure of the present invention. Surprisingly also, the copolymers obtainable by grafting the acrylic ester or esters on poly(vinyl acetate) but without carrying out the graft copolymerization with a partially saponified poly(vinyl acetate) in the copolymerization medium do not provide coating compositions having the low yield values and improved flow and leveling characterstics.

In the procedure required for the present invention, vinyl acetate is first formed into what may be termed a prepolymer. This is accomplished by polymerizing the vinyl acetate by means of a free-radical polymerization catalyst or initiator in an aqueous emulsion of the monomer. The concentration of the vinyl acetate may be from about 5 to 35% in the water and the amount of free-radical initiator may be from 0.1 to 3% on the weight of the vinyl acetate. The proportion of emulsifier may be from about 5 to 20% on the weight of vinyl acetate. The polymerization may be effected under the usual conditions of temperature and time such as from about room temperature up to 90° C. for a time of a few minutes to eight hours or more.

The emulsifier employed in the polymerization of the vinyl acetate may be either a non-ionic or an anionic emulsifier. Examples of the anionic emulsifier include the alkali metal salts of the higher fatty alcohol sulfates such as sodium lauryl sulfate, the higher fatty acid salts such as sodium oleate, ammonium stearate or triethanolamine palmitate, the alkylaryl sulfonate salts such as the alkali metal salts of isopropylbenzene sulfonates or isopropyl naphthalene sulfonates, alkali metal higher alkyl sulfosuccinates, e.g. sodium octyl sulfosuccinate, sodium N-methyl-N-palmitoyltaurate, sodium oleyl isothionate, alkali metal salts of alkylarylpolyethoxyethanol sulfates or sulfonates, e.g. sodium octylphenoxypolyethoxyethylsulfate in which the oxyethylene units may be from 2 to 50 or more per molecule; and the alkali metal salts of the sulfates of the methylene-bridged alkylphenols obtained by condensation of formaldehyde therewith and in which the alkyl groups may each contain from 4 to 18 carbon atoms.

Examples of non-ionic emulsifiers include alkylphenoxypolyethoxyethanols having alkyl groups of about seven to eighteen carbon atoms and 6 to 60 or more oxyethylene units, such as heptylphenoxypolyethanoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxythylene units per molecule; analogous ethyleneoxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; also ethylene oxide condensates of long-chain or branched chain amines, such as dodecylamine, hexadecylamine, and octadeylamine, containing 6 to 60 oxyethylene groups; block copolymers of ethylene oxide and propylene oxide comprising a hydrophobic propylene oxide section combined with one or more hydrophilic ethylene oxide sections.

After the preparation of the vinyl acetate polymer dispersion, at least one ester of acrylic acid or methacrylic acid is added to the dispersion with additional emulsifier (additional initiator may also be used), the addition of the ester being effected while the polyvinyl acetate is still in an activated or "live" condition so that the acrylic ester is grafted thereon. At this stage, it is essential that a 75% to 90% saponified poly(vinyl acetate) be present in an amount of 1% to 6%, preferably 2% to 3%, of the total weight of monomers including vinyl acetate. The production of the partially hydrolyzed poly(vinyl acetate) is critical since the use of less than 1% produces proportion of the partially hydrolyzed poly(vinyl acetate) is critical since the use of less than 1% produces polymers which produce coating compositions having high yield values. The proportion of acrylic ester relative to the vinyl acetate is in the range of 3:1 to 19:1 weight ratios. Any ester of an alcohol having 1 to 18 carbon atoms, preferably 1 to 8 carbon atoms, of acrylic acid or methacrylic acid may be employed. The preferred examples include saturated monohydric alcohols, such as methyl acrylate, ethyl acrylate, propyl acrylate, isopropyl acrylate, butyl acrylate, sec-butyl acrylate, t-butyl acrylate, isobutyl acrylate, amyl acrylate, n-hexyl acrylate, n-octyl acrylate, t-octyl acrylate, octadecyl acrylate, dodecyl acrylate, and the corresponding methacrylates. The hardness and toughness of the final films obtained from the copolymer dispersions may be adjusted by using mixtures of these monomers and adjusting the proportions between the lower methacrylates having from 1 to 4 carbon atoms in the alkyl group which impart hardness and the proportion of the other acrylates or methacrylates which generally impart softness to the copolymer.

The amount of emulsifier added with the charge of the acrylic ester or esters when added to the amount introduced originally with the vinyl acetate should be enough to provide 4 to 7% of emulsifier, based on the total weight of monomers including vinyl acetate and acrylic ester or esters. The proportion of initiator added may be from zero to 3% on the weight of the additonal acrylic ester monomer or monomers. This second stage of polymerization in which the acrylic ester or esters are grafted on the vinyl acetate polymer may be carried out at temperatures and for times corresponding to the conditions set out hereinabove in connection with the preliminary polymerization of the vinyl acetate. The aqueous emulsion polymer dispersions may be prepared with graft copolymer contents of 15% or less up to about 50% or more and can be diluted if desired down to 1% copolymer content in preparation for formulation or use.

Besides acrylic esters, there may be included other monomers in an amount up to 5% by weight of total monomers including the vinyl acetate; generally, not over 2% of monomers containing hydrophilic groups such as carboxyl, hydroxyl, amino, and amide groups, should be included; preferably such hydrophilic groups are avoided entirely. Examples of the other comonomers include acrylonitrile, styrene, vinyl toluene, methacrylonitrile, vinyl chloride, vinylidene chloride, ethylene, isobutylene, acrylic acid, methacrylic acid, itaconic acid, citraconic acid, maleic acid, fumaric acid, acrylamide, methacrylamide, hydroxyalkyl acrylates or methacrylates such as β-hydroxyethyl acrylate, aminoalkyl acrylates or methacrylates such as dimethylaminoethyl acrylate, hydroxyalkyl vinyl sulfides such as β-hydroxyethyl vinyl sulfide, vinyl ethers such as isobutyl vinyl ether and methyl vinyl ether, and so on. Additional vinyl acetate up to 5% on total monomers may also be included at this stage.

The copolymer dispersions of the present invention may be formulated into aqueous coating compositions, such as water-base paints and the like, by the addition of a thickening agent and, if desired of one or more pigments or extenders. Coating compositions having a high solids content sometimes have sufficient viscosity for use without thickeners. Such compositions have low yield values. However, even those coating compositions obtained from the copolymers of the present invention and the common thickening agents used in amounts of 0.01% to about 3% or, in some cases, up to about 5% based on the weight of the binder or polymer, which may consist entirely of the graft copolymer, give low yield values. Examples of the thickeners that can be used include: casein, α-protein gum tragacanth; ammonium and alkali metal (especially sodium, potassium or lithium) alginates; ammonium and alkali metal salts of polyacrylic acid or polymethacrylic acid including the water-soluble salts obtained by the hydrolysis, complete or partial (e.g. 25% to 100%) of polyacrylonitrile or of polymers of methyl acrylate, ethyl acrylate, methyl methacrylate, and so on, and the water-soluble ammonium and alkali metal salts of copolymers of 25% to 95% or more of acrylic or methacrylic acid with one or more esters, nitriles or amides of these acids, with or without 0.1% to 0.8% of a cross-linking polyethylenically unsaturated monomer such as diallyl phthalate, ethylene glycol dimethacrylate, or divinyl benzene; water-soluble cellulose ethers such as methyl cellulose, hydroxyethyl cellulose and the water-insoluble, alkali-soluble cellulose ethers, such as hydroxymethyl cellulose or carboxymethyl cellulose, which can be used as the ammonium or alkali metal salts.

The proportion of pigmentary material employed in compounding to form aqueous coating compositions may vary widely. Thus, the ratio of pigment to binder may be anywhere from 20:1 to 1:20 but is preferably between 9:1 and 1:9. The binder in such compositions may consist entirely of the graft copolymers of the present invention or it may comprise a mixture of 5% to 95% thereof with 95% to 5% respectively of one or more polymeric film-forming materials. In the pigmented coating compositions the solids content may vary from about 10% to about 70% by weight.

Pigments suitable for use according to the invention are inorganic pigments such as, for example, chrome yellows, Prussian blues and Brunswick greens, titanium pigments such as titanium dioxide, extended titanium pigments (extended with either precipitated or natural extenders, such as alkali earth sulphates for instance calcium sulphate, barium sulphate and the like), tinted titanium pigments, titanates such as barium, zinc, lead magnesium titanates, and the like. Additionally, other types of inorganic pigments might be included, such as zinc sulphide pigments, for instance, zinc sulphide, lithopone, other extended zinc sulphide pigments, such as calcium base lithopone, zinc sulphide extended with natural extenders, and the like, zinc oxide and antimony oxide, or organic pigments, that is organic coloring matters which are devoid of sulphonic, carboxylic or other water-solubilizing groups. Also for the purposes of this invention we include within the term "pigment" other water-insoluble organic coloring matters such as, for example, the calcium or barium lakes of azo lake dyestuffs.

In the examples which are illustrative of the present invention, the parts and percentages are by weight unless otherwise specifically designated. The yield values given are those determined with a modified Stoermer Viscometer having a rotatable bob of a 1.23 inch diameter and 1.39 inch height. The bob is suspended within a cup (of 1.84" diameter and 2.55" height) containing the liquid or suspension to be tested and is rotated therein by the pull of a cord wound on a drum or pulley mounted on the axis of the bob and fixed thereto. The cord extends over a substantially frictionless pulley and supports a replaceable weight from which another cord suspends a fixed weight of 200 grams. The system is arranged so that both weights initially cause rotation of the bob in the liquid or suspension being tested (which is held at 77° F. during the test) but the fixed weight comes to rest very quickly after the starting of a test so that the variable weight of much smaller magnitude than the fixed weight is left as the sole driving force for continuing the rotation of the bob within the polymer dispersion after the fixed weight has come to rest. By plotting a curve with revolutions per minute as the ordinates and various weights as abscissae (using weights which are so selected as to give direct reading or values in dynes per square centimeter) and extrapolating the curve to the horizontal axis, the yield value is obtained in dynes per square centimeter.

Example 1

(a) Twenty parts of vinyl acetate are emulsified in 60 parts of water with 3.8 parts of the sodium salt of the sulfate of t-octylphenoxyethoxyethoxyethanol. The temperature of this mixture is adjusted to about 20° C. then the following materials are added to effect polymerization: 0.035 part ammonium persulfate, 0.007 part t-butylhydroperoxide, and 0.042 part sodium hydrosulfite. At the peak temperature, which is about 80° C. there are added simultaneously over a period of about two hours the following: 0.165 part ammonium persulfate dissolved in 4 parts water, 0.18 part sodium metabisulfite dissolved in 4 parts water, and a monomer emulsion consisting of 53.3 parts ethyl acrylate, 26.7 parts methyl methacrylate, 2 parts of 88% hydrolyzed poly(vinyl acetate), 38 parts water, and 0.5 part of the same emulsifier as used in the polymerization of the vinyl acetate monomer. The temperature is maintained at about 80° C. during the additions and for one hour afterwards. After that, the dispersion is cooled to room temperature and neutralized with concentrated ammonium hydroxide to a pH of about 9. The resulting dispersion is stable and has a solids content of about 50%.

(b) A mixture of 216 lbs. of water, about 3 lbs. of polymethacrylic acid, about ¾ of a lb. of the sodium salt of the copolymer of a 50:50 mole ratio maleic anhydride/diisobutylene copolymer, and about ½ lb. of t-octylphenoxyethylethoxyethanol containing about 10 ethylene oxide units, 3 lbs. of pine oil as an anti-foam, 250 lbs. of titanium dioxide, 107 lbs. of calcium carbonate, and 137 lbs. of diatomaceous silica is prepared and passed through a three-roll mill. Then 341 lbs. of the copolymer dispersion prepared in part (a) containing approximately 174 lbs. of the copolymer is added to the pigment dispersion and enough water is added to make a total of 460 lbs. thereof in the entire mixture. Forty-eight pounds of an aqueous solution containing 6% of sodium polyacrylate is added and after stirring the mixture, sufficient water is finally added to bring the viscosity to 70 Krebs units (K.U.).

(c) The paint obtained in part (b) has a yield value of zero and was found to be applicable by brushing without the showing of excessive brush marks. The paint has excellent flow and leveling qualities.

(d) When a terpolymer is prepared from a mixture of the three monomers, vinyl acetate, ethyl acrylate, and methyl methacrylate, with the same initator in the same proportion based on the monomers and the same emulsifier and 88% hydrolyzed poly(vinyl acetate) are used in the same proportion based on the monomers as in (a), a copolymer is obtained which when incorporated in the paint formation as in (b) produces a paint which is difficult to spread without leaving excessive brush marks and has a yield value of 6.

Example 2

The procedure of Example 1(a) and (b) is repeated except that the amount of emulsifier employed in the polymerization of the vinyl acetate is 2 parts by weight and the amount of emulsifier added with the acrylic esters is 2.3 parts by weight. The paint obtained exhibits excellent brush qualities and has a yield value of 1.5.

A low yield value is also obtained when the sodium polyacrylate thickener is replaced with methyl cellulose.

Example 3

The procedure of Example 1(a) and (b) is repeated except that the proportion of emulsifier employed in the polymerization of the vinyl acetate is 3 parts by weight and the amount of emulsifier added with the acrylic esters is 1 part by weight. The paint obtained exhibits excellent brush qualities and has a yield value of 1.0.

A low yield value is also obtained when the sodium polyacrylate thickener is replaced with sodium alginate.

Example 4

The procedure of Example 1(a) and (b) is repeated except that the proportion of emulsifier employed in the polymerization of the vinyl acetate is 2.5 parts by weight and the amount of emulsifier added with the acrylic esters is 2 parts by weight. The paint obtained exhibits excellent brush qualities and has a yield value of 3.

A low yield value is also obtained when the sodium polyacrylate thickener is replaced with casein.

Example 5

The procedure of Example 1(a) is repeated, but the ethyl acrylate is replaced with 40 parts of 2-ethyl hexyl acrylate, the methyl methacrylate is increased to 40 parts, and the amount of the vinyl acetate is reduced to 9 parts by weight so that the graft copolymer ultimately obtained contains about 10% polyvinyl acetate on the entire weight of the copolymer. The paint obtained as in Example 1(b) exhibits excellent brushing qualities.

A low yield value is also obtained when the sodium polyacrylate thickener is replaced with carboxymethyl cellulose.

Example 6

The procedure of Example 1(a) is repeated, but the amount of vinyl acetate is reduced to 9 parts by weight so that the graft copolymer ultimately obtained contains about 10% poly(vinyl acetate) on the entire weight of the copolymer, and 3 parts of 75% hydrolyzed poly(vinyl acetate) was used instead of the 88% hydrolyzed poly (vinyl acetate). A paint obtained employing the resulting graft copolymer in the paint formulation of Example 1(b) exhibits excellent flow and leveling characteristics.

Example 7

The procedure of Example 1(a) is repeated except the amount of ethyl acrylate and methyl methacrylate used is 46 parts and 34 parts respectively. A paint obtained using this copolymer in the formulation of Example (b) exhibits excellent flow and leveling characteristics.

It is to be understood that changes and variations may be made without departing from the spirit and scope of the invention as defined in the appended claims.

We claim:

1. The method which comprises adding an emulsifier selected from the group consisting of anionic emulsifiers and non-ionic emulsifiers, a 75% to 90% hydrolyzed polyvinyl acetate, and monoethylenically unsaturated molecules comprising at least one ester of a saturated monohydric alcohol having 1 to 18 carbon atoms and an acid of the formula

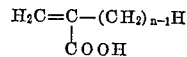

in which $n$ is an integer having a value of 1 to 2, to an aqueous dispersion containing polyvinyl acetate in an activated condition wherein it is capable of further polymerization, the amount of ester added being from 3 to 19 times the amount of polyvinylacetate, the amount of hydrolyzed polyvinyl acetate being about 1 to 6% by weight of the total weight of monoethylenically unsaturated molecules and polyvinyl acetate, and maintaining the mixture at a temperature in the range from room temperature to about 90° C. while it contains a free-radical initiator until the monoethylenically unsaturated molecules are substantially copolymerized with the polyvinyl acetate.

2. A composition comprising an aqueous dispersion of a copolymer obtained by the process of claim 1.

3. The method which comprises adding an emulsifier selected from the group consisting of anionic and nonionic emulsifiers, a 75% to 90% hydrolyzed polyvinyl acetate, and a mixture of at least one lower alkyl methacrylate in which the alkyl group has 1 to 4 carbon atoms with at least one ester, other than the lower alkyl methacrylates defined, of a saturated monohydric alcohol having 1 to 18 carbon atoms and an acid of the formula

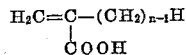

in which $n$ is an integer having a value of 1 to 2, to an aqueous dispersion containing polyvinyl acetate in an activated condition wherein it is capable of further polymerization, the sum of the weights of the lower alkyl methacrylate and the other ester of the acid of the aforementioned formula being from 3 to 19 times the weight of the polyvinyl acetate, the amount of the lower alkyl methacrylate being up to about 45% by weight of the total of the weights of lower alkyl methacrylate, the other ester of the acid of the aforementioned formula, and the polyvinyl acetate, and the amount of the hydrolyzed polyvinyl acetate being about 1 to 6% by weight based on the aforesaid total, and maintaining the mixture at a temperature in the range from room temperature to about 90° C. while it contains a free-radical initiator until the lower alkyl methacrylate and the other ester of the acid of the aforementioned formula are substantially copolymerized with the polyvinyl acetate.

4. A composition comprising an aqueous dispersion of a copolymer obtained by the process of claim 3.

5. A composition comprising an aqueous dispersion of a copolymer obtained by the process of claim 3 in which the copolymer comprises units of ethyl acrylate and methyl methacrylate.

6. A composition comprising an aqueous dispersion of a copolymer obtained by the process of claim 3 in which the copolymer comprises about 20% by weight of polyvinyl acetate, about 53% by weight of ethyl acrylate, and about 27% by weight of methyl methacrylate.

7. A composition comprising an aqueous dispersion of a copolymer obtained by the process of claim 3 in which the copolymer comprises about 20% by weight of polyvinyl acetate, about 46% by weight of ethyl acrylate, and about 34% by weight of methyl methacrylate.

8. A composition comprising an aqueous dispersion of a copolymer obtained by the process of claim 3 in which the copolymer comprises about 10% by weight of polyvinyl acetate, about 45% by weight of 2-ethylhexyl acrylate, and about 45% by weight of methyl methacrylate.

9. A composition comprising an aqueous dispersion of a copolymer obtained by the process of claim 3 in which the copolymer comprises about 10% by weight of polyvinyl acetate, about 60% by weight of ethyl acrylate, and about 30% by weight of methyl methacrylate.

10. A composition comprising an aqueous dispersion of a copolymer obtained by the process of claim 1 which composition also contains a thickener dissolved in the aqueous phase of the composition and a pigment suspended therein, the solids content being from 10% to about 70% by weight.

References Cited in the file of this patent
UNITED STATES PATENTS

| | | |
|---|---|---|
| 2,123,599 | Fikentscher et al. | July 12, 1938 |
| 2,279,436 | Berg | Apr. 14, 1942 |
| 2,320,924 | Gift | June 1, 1943 |
| 2,343,089 | Smith | Feb. 29, 1944 |
| 2,741,650 | Lukman et al. | Apr. 10, 1956 |
| 2,837,496 | Vandenberg | June 3, 1958 |
| 2,840,447 | Green | June 24, 1958 |

FOREIGN PATENTS

| | | |
|---|---|---|
| 499,577 | Canada | Jan. 26, 1954 |

OTHER REFERENCES

Singer: Fundamentals of Paint, Varnish and Laq. Tech., The American Paint Journal Company, St. Louis, Missouri, 1957, pages 246–249.